(12) United States Patent
Chen et al.

(10) Patent No.: US 7,777,972 B1
(45) Date of Patent: Aug. 17, 2010

(54) IMAGING OPTICAL LENS ASSEMBLY

(75) Inventors: Chun-Shan Chen, Taichung (TW); Hsiang-Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/483,748

(22) Filed: Jun. 12, 2009

(30) Foreign Application Priority Data

Feb. 19, 2009 (TW) .............................. 98105232 A

(51) Int. Cl.
*G02B 9/34* (2006.01)
*G02B 13/18* (2006.01)

(52) U.S. Cl. ...................... 359/773; 359/715; 359/740

(58) Field of Classification Search ................ 359/715, 359/738, 740, 773
See application file for complete search history.

(56) References Cited

U.S. PATENT DOCUMENTS

| | | | | |
|---|---|---|---|---|
| 7,477,459 | B2 * | 1/2009 | Liao | 359/773 |
| 7,492,532 | B2 * | 2/2009 | Shin | 359/773 |
| 2004/0136097 | A1 * | 7/2004 | Park | 359/773 |
| 2007/0188890 | A1 * | 8/2007 | Jo et al. | 359/773 |
| 2009/0009889 | A1 * | 1/2009 | Teraoka et al. | 359/773 |
| 2009/0015944 | A1 * | 1/2009 | Taniyama | 359/773 |
| 2009/0207507 | A1 * | 8/2009 | Shinohara | 359/773 |

* cited by examiner

*Primary Examiner*—Evelyn A. Lester
(74) *Attorney, Agent, or Firm*—Birch, Stewart, Kolasch & Birch, LLP

(57) ABSTRACT

The present invention provides an imaging optical lens assembly including, in order from the object side to the image side: a first lens group comprising a first lens element with positive refractive power, no lens element with refractive power being disposed between the first lens element and an imaged object, the first lens element being the only lens element with refractive power in the first lens group; and a second lens group comprising, in order from the object side to the image side: a second lens element with negative refractive power; a third lens element; and a fourth lens element; wherein focusing adjustment is performed by moving the first lens element along an optical axis, such that as a distance between the imaged object and the imaging optical lens assembly changes from far to near, a distance between the first lens element and an image plane changes from near to far; and wherein the number of the lens elements with refractive power in the imaging optical lens assembly is N, and it satisfies the relation: $4 \leq N \leq 5$. The abovementioned arrangement of optical elements and focusing adjustment method enable the imaging optical lens assembly to obtain good image quality and consume less power.

19 Claims, 16 Drawing Sheets

TABLE 1

(Embodiment 1)

f = 4.33 mm, Fno = 2.90, HFOV = 33.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.089 | | | | |
| 2 | Lens 1 | 2.16949 (ASP) | 0.900 | Plastic | 1.544 | 55.9 | 3.03 |
| 3 | | -5.88250 (ASP) | 0.200 | | | | |
| 4 | Lens 2 | 100.00000 (ASP) | 0.383 | Plastic | 1.632 | 23.4 | -5.27 |
| 5 | | 3.21670 (ASP) | 0.614 | | | | |
| 6 | Lens 3 | -2.18540 (ASP) | 0.766 | Plastic | 1.530 | 55.8 | 3.05 |
| 7 | | -1.04238 (ASP) | 0.070 | | | | |
| 8 | Lens 4 | 2.90877 (ASP) | 0.581 | Plastic | 1.530 | 55.8 | -3.05 |
| 9 | | 0.96623 (ASP) | 0.300 | | | | |
| 10 | IR-filter | Plano | 0.200 | Glass | 1.517 | 64.2 | - |
| 11 | | Plano | 0.500 | | | | |
| 12 | Cover Glass | Plano | 0.300 | Glass | 1.517 | 64.2 | - |
| 13 | | Plano | 0.484 | | | | |
| 14 | Image | Plano | | | | | |

*Object Distance 100 mm: surface 3 thickness = 0.287 mm, f = 4.23 mm

Fig.7

TABLE 2

| | Aspheric Coefficients | | | |
|---|---|---|---|---|
| Surface # | 2 | 3 | 4 | 5 |
| k = | -6.42322E+00 | 0.00000E+00 | -1.00000E+03 | -1.63883E+01 |
| A4 = | 5.41140E-02 | -1.09227E-02 | 6.01150E-02 | 1.56920E-01 |
| A6 = | -1.96445E-02 | -5.15556E-02 | -1.82457E-01 | -1.94068E-01 |
| A8 = | -1.14833E-01 | 2.49347E-02 | 2.74168E-01 | 2.21172E-01 |
| A10 = | 7.09572E-01 | 2.44208E-02 | -1.16446E-01 | -1.06404E-01 |
| A12 = | -2.32230E+00 | -4.66235E-02 | -2.68287E-01 | -4.40642E-02 |
| A14 = | 3.54279E+00 | -3.82606E-04 | 4.12009E-01 | 8.18527E-02 |
| A16= | -2.03569E+00 | | -1.82905E-01 | -2.86683E-02 |
| Surface # | 6 | 7 | 8 | 9 |
| k = | -2.29304E+01 | -4.53794E+00 | -3.30328E+00 | -5.73407E+00 |
| A4 = | -1.16793E-01 | -1.19883E-01 | -2.18847E-01 | -1.13293E-01 |
| A6 = | 1.94942E-01 | 3.58178E-02 | 7.07747E-02 | 4.13104E-02 |
| A8 = | -3.69015E-01 | 3.08158E-03 | -4.89029E-03 | -1.28908E-02 |
| A10= | 2.56431E-01 | -2.21268E-02 | -2.89861E-03 | 2.95065E-03 |
| A12 = | 5.95191E-02 | 1.13277E-02 | 3.46094E-04 | -5.61966E-04 |
| A14= | -1.65957E-01 | 1.86502E-03 | 1.72668E-04 | 7.44048E-05 |
| A16= | 6.38640E-02 | -9.98190E-04 | -3.06196E-05 | -4.89505E-06 |

Fig.8

TABLE 3

(Embodiment 2)

f = 4.25 mm, Fno = 2.90, HFOV = 33.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.102 | | | | |
| 2 | Lens 1 | 1.89503 (ASP) | 0.900 | Plastic | 1.544 | 55.9 | 2.99 |
| 3 | | -9.59770 (ASP) | 0.200 | | | | |
| 4 | Lens 2 | -21.59870 (ASP) | 0.346 | Plastic | 1.632 | 23.4 | -5.33 |
| 5 | | 4.01330 (ASP) | 0.504 | | | | |
| 6 | Lens 3 | -3.30370 (ASP) | 0.761 | Plastic | 1.544 | 55.9 | 4.70 |
| 7 | | -1.55897 (ASP) | 0.600 | | | | |
| 8 | Lens 4 | 2.57806 (ASP) | 0.350 | Plastic | 1.530 | 55.8 | -3.97 |
| 9 | | 1.10343 (ASP) | 0.300 | | | | |
| 10 | IR-filter | Plano | 0.200 | Glass | 1.517 | 64.2 | - |
| 11 | | Plano | 0.500 | | | | |
| 12 | Cover Glass | Plano | 0.300 | Glass | 1.517 | 64.2 | - |
| 13 | | Plano | 0.089 | | | | |
| 14 | Image | Plano | | | | | |

*Object Distance 100 mm: surface 3 thickness = 0.283 mm, f = 4.36 mm

Fig.9

TABLE 4

Aspheric Coefficients

| Surface # | 2 | 3 | 4 | 5 |
|---|---|---|---|---|
| k = | -3.87349E+00 | 0.00000E+00 | 1.25366E+02 | -3.52526E+01 |
| A4 = | 6.32581E-02 | 5.09665E-03 | 8.43181E-02 | 1.78238E-01 |
| A6 = | -4.00870E-02 | -4.18441E-02 | -1.59342E-01 | -1.84920E-01 |
| A8 = | -5.03443E-02 | 3.35220E-02 | 2.35534E-01 | 2.13392E-01 |
| A10 = | 7.64212E-01 | -2.23277E-02 | -1.18827E-01 | -1.04308E-01 |
| A12 = | -2.58608E+00 | 8.22940E-03 | -2.49182E-01 | -4.03773E-02 |
| A14 = | 3.71028E+00 | -2.02587E-02 | 4.34601E-01 | 8.43271E-02 |
| A16= | -1.98186E+00 |  | -2.09716E-01 | -3.19236E-02 |

| Surface # | 6 | 7 | 8 | 9 |
|---|---|---|---|---|
| k = | -6.08404E+01 | -3.51853E+00 | -6.80667E+01 | -7.60755E+00 |
| A4 = | -1.90860E-01 | -9.19376E-02 | -2.22385E-01 | -1.25750E-01 |
| A6 = | 2.58744E-01 | 2.04732E-02 | 7.47643E-02 | 4.71329E-02 |
| A8 = | -3.73925E-01 | 5.82878E-03 | -4.26188E-03 | -1.49248E-02 |
| A10= | 2.46479E-01 | -1.72439E-02 | -3.05562E-03 | 3.37376E-03 |
| A12 = | 6.78949E-02 | 1.26764E-02 | 2.69255E-04 | -5.75776E-04 |
| A14= | -1.56664E-01 | 1.56195E-03 | 1.64291E-04 | 6.22629E-05 |
| A16= | 5.48830E-02 | -1.71070E-03 | -2.55825E-05 | -3.47004E-06 |

Fig.10

TABLE 5

(Embodiment 3)

f = 4.23 mm, Fno = 2.90, HFOV = 33.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.102 | | | | |
| 2 | Lens 1 | 1.83571 (ASP) | 0.900 | Plastic | 1.544 | 55.9 | 2.90 |
| 3 | | -9.26100 (ASP) | 0.200 | | | | |
| 4 | Lens 2 | -6.73390 (ASP) | 0.311 | Plastic | 1.632 | 23.4 | -5.06 |
| 5 | | 6.20280 (ASP) | 0.555 | | | | |
| 6 | Lens 3 | -2.41850 (ASP) | 0.736 | Plastic | 1.544 | 55.9 | 3.22 |
| 7 | | -1.12530 (ASP) | 0.261 | | | | |
| 8 | Lens 4 | 1.90758 (ASP) | 0.320 | Plastic | 1.544 | 55.9 | -3.16 |
| 9 | | 0.85107 (ASP) | 0.300 | | | | |
| 10 | IR-filter | Plano | 0.200 | Glass | 1.517 | 64.2 | - |
| 11 | | Plano | 0.500 | | | | |
| 12 | Cover Glass | Plano | 0.300 | Glass | 1.517 | 64.2 | - |
| 13 | | Plano | 0.474 | | | | |
| 14 | Image | Plano | | | | | |

*Object Distance 100 mm: surface 3 thickness = 0.278 mm, f = 4.35 mm

Fig.11

TABLE 6

Aspheric Coefficients

| Surface # | 2 | 3 | 4 | 5 |
|---|---|---|---|---|
| k = | -3.68354E+00 | 4.27537E-01 | -1.18048E+02 | -4.86168E+01 |
| A4 = | 6.60970E-02 | 4.25004E-03 | 8.41135E-02 | 1.87208E-01 |
| A6 = | -3.92891E-02 | -4.02627E-02 | -1.61690E-01 | -1.84789E-01 |
| A8 = | -5.48599E-02 | 3.32827E-02 | 2.46696E-01 | 2.09987E-01 |
| A10 = | 7.67707E-01 | -2.18444E-02 | -1.10007E-01 | -1.00444E-01 |
| A12 = | -2.57677E+00 | 9.96757E-03 | -2.51777E-01 | -3.29311E-02 |
| A14 = | 3.69371E+00 | -3.24649E-02 | 4.19955E-01 | 8.88264E-02 |
| A16= | -1.98154E+00 | -3.55830E-04 | -2.15316E-01 | -4.33497E-02 |
| Surface # | 6 | 7 | 8 | 9 |
| k = | -3.22944E+01 | -3.25133E+00 | -4.08630E+01 | -6.51806E+00 |
| A4 = | -2.08072E-01 | -9.36284E-02 | -2.08003E-01 | -1.43476E-01 |
| A6 = | 2.67223E-01 | 1.47155E-02 | 7.38545E-02 | 5.61405E-02 |
| A8 = | -3.84575E-01 | 5.87603E-03 | -4.41204E-03 | -1.67975E-02 |
| A10= | 2.37336E-01 | -1.59335E-02 | -3.08231E-03 | 3.32273E-03 |
| A12 = | 6.76477E-02 | 1.30256E-02 | 2.62777E-04 | -5.28673E-04 |
| A14= | -1.53505E-01 | 1.56088E-03 | 1.63916E-04 | 6.68925E-05 |
| A16= | 5.58447E-02 | -1.82229E-03 | -2.51552E-05 | -5.25040E-06 |

Fig.12

TABLE 7

|  | Embodiment 1 | Embodiment 2 | Embodiment 3 |
|---|---|---|---|
| f | 4.33 | 4.25 | 4.23 |
| Fno | 2.90 | 2.90 | 2.90 |
| HFOV | 33.5 | 33.5 | 33.5 |
| N | 4 | 4 | 4 |
| fmax/fmin | 1.02 | 1.03 | 1.03 |
| \|BFL1-BFL2\| | 0.0 | 0.0 | 0.0 |
| (D1-D2)*100/f | 2.02 | 1.98 | 1.87 |
| V1 | 55.9 | 55.9 | 55.9 |
| V2 | 23.4 | 23.4 | 23.4 |
| f/f1 | 1.43 | 1.42 | 1.46 |
| f/f3 | 1.42 | 0.90 | 1.31 |
| T34/T23 | 0.11 | 1.19 | 0.47 |
| TTL/ImgH | 1.84 | 1.75 | 1.75 |

Fig.13

IMAGING OPTICAL LENS ASSEMBLY

BACKGROUND OF THE INVENTION

1. Field of the Invention

The present invention relates to an imaging optical lens assembly, and more particularly, to an imaging optical lens assembly with focusing adjustment.

2. Description of the Prior Art

In recent years, with the popularity of camera mobile phones, the demand for compact photographing lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and compact photographing lenses have gradually evolved toward higher megapixels, there is an increasing demand for compact photographing lenses featuring better image quality.

A conventional compact photographing lens equipped in a mobile phone is usually a single focus lens having a fixed focal length. For a specific object distance, since the photographing lens has a limited depth of field, it is apt to produce blurred images. Therefore, as the resolution of compact photographing lenses increases, a focusing adjustment function becomes more and more indispensable as well. Generally, a photographing lens with focusing adjustment function performs focusing adjustment by using a driving motor to move the entire photographing lens relative to the sensor. However, such a photographing lens requires higher power consumption because the driving motor is configured to drive the entire photographing lens. Moreover, the photographing lens has a relatively long total track length.

SUMMARY OF THE INVENTION

The present invention provides an imaging optical lens assembly including, in order from the object side to the image side: a first lens group comprising a first lens element with positive refractive power, no lens element with refractive power being disposed between the first lens element and an imaged object, the first lens element being the only lens element with refractive power in the first lens group; and a second lens group comprising, in order from the object side to the image side: a second lens element with negative refractive power; a third lens element; and a fourth lens element; focusing is performed by moving the first lens element along the optical axis, such that as a distance between the imaged object and the imaging optical lens assembly changes from far to near, a distance between the first lens element and the imaging surface changes from near to far, and during focusing the other lens elements in the imaging optical lens assembly do not move relative to the imaging plane; and wherein the number of the lens elements with refractive power in the imaging optical lens assembly is N, and it satisfies the relation: $4 \leq N \leq 5$.

According to one aspect of the present invention, there is provided a method for performing focusing for an imaging optical lens assembly; wherein the lens assembly includes, in order from the object side to the image side: a first lens group comprising a first lens element with positive refractive power, no lens element with refractive power being disposed between the first lens element and an imaged object, the first lens element being the only lens element with refractive power in the first lens group; and a second lens group comprising, in order from the object side to the image side: a second lens element with negative refractive power; a third lens element; and a fourth lens element; and wherein the method for performing focusing includes moving the first lens element along the optical axis, such that as a distance between the imaged object and the imaging optical lens assembly changes from far to near, a distance between the first lens element and the imaging surface changes from near to far, and during focusing the other lens elements in the imaging optical lens assembly can either move or not move relative to the imaging plane.

The aforementioned arrangement of lens groups can effectively improve the image quality of the imaging optical lens assembly. In the present imaging optical lens assembly, a single lens element, the first lens element, is selected to move along the optical axis to perform the focusing adjustment so that less power will be consumed during the focusing process. In addition, by selecting the first lens element to perform focusing adjustment, the number of lens groups can be reduced to effectively reduce the variability in the assembly/manufacturing of the imaging optical lens assembly.

BRIEF DESCRIPTION OF THE DRAWINGS

FIG. 7 is TABLE 1 which lists the optical data of the first embodiment.

FIG. 8 is TABLE 2 which lists the aspheric surface data of the first embodiment.

FIG. 9 is TABLE 3 which lists the optical data of the second embodiment.

FIG. 10 is TABLE 4 which lists the aspheric surface data of the second embodiment.

FIG. 11 is TABLE 5 which lists the optical data of the third embodiment.

FIG. 12 is TABLE 6 which lists the aspheric surface data of the third embodiment.

FIG. 13 is TABLE 7 which lists the data of the respective embodiments resulted from the equations.

DETAILED DESCRIPTION OF THE PREFERRED EMBODIMENTS

Figure 1:
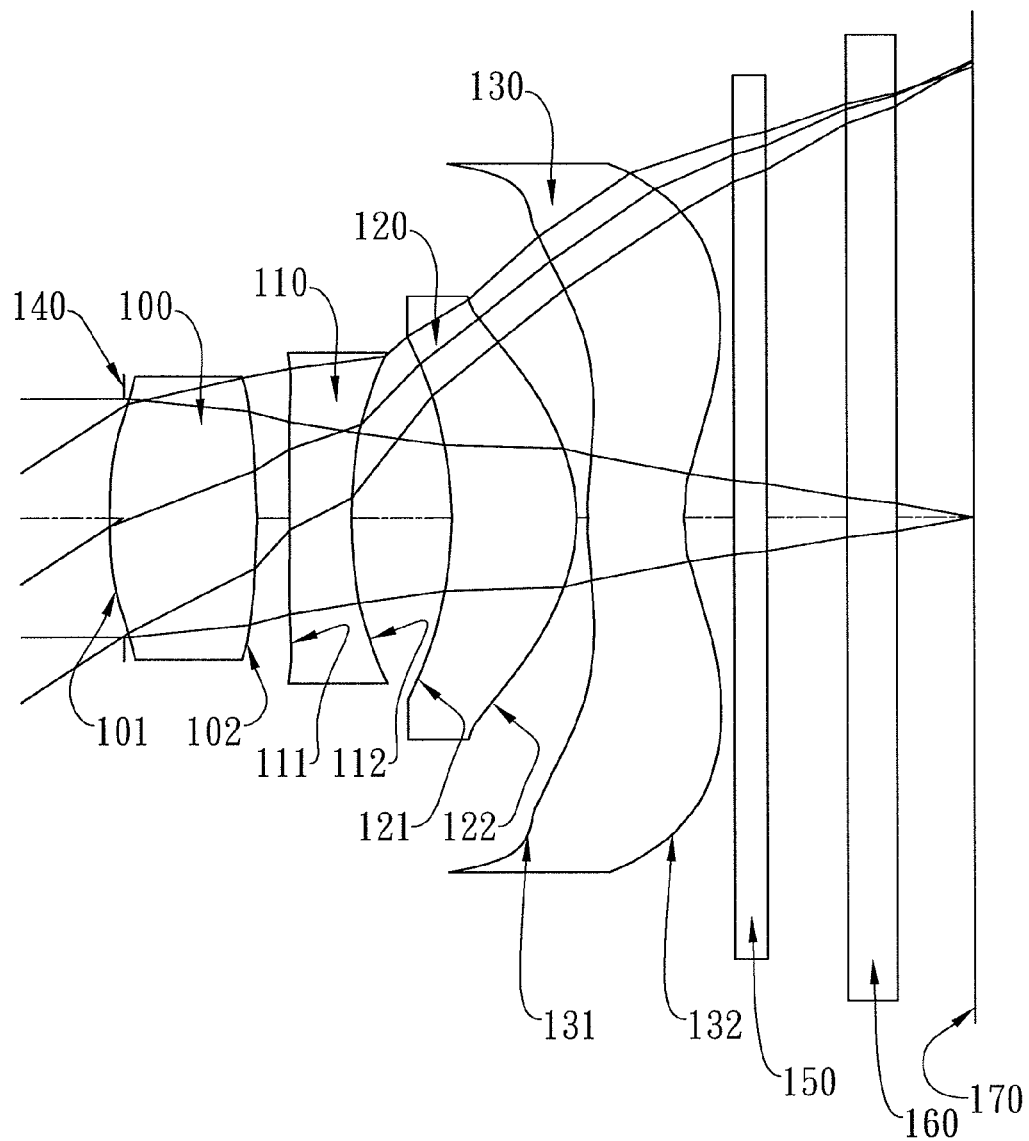
FIG. 1 shows an imaging optical lens assembly in accordance with a first embodiment of the present invention.

The present invention provides an imaging optical lens assembly including, in order from the object side to the image side: a first lens group comprising a first lens element with positive refractive power, no lens element with refractive power being disposed between the first lens element and an imaged object, the first lens element being the only lens element with refractive power in the first lens group; and a second lens group comprising, in order from the object side to the image side: a second lens element with negative refractive power; a third lens element; and a fourth lens element; wherein focusing is performed by moving the first lens element along the optical axis, such that as a distance between the imaged object and the imaging optical lens assembly changes from far to near, a distance between the first lens element and the imaging surface changes from near to far; and wherein the number of the lens elements with refractive power in the imaging optical lens assembly is N, and it satisfies the relation: $4 \leq N \leq 5$.

When the relation of N=5 is satisfied, the fifth lens element can be disposed between the first and second lens elements, the third and fourth lens elements, or the fourth lens element and the image plane.

In the aforementioned imaging optical lens assembly, the focal length of the imaging optical lens assembly is f when the first lens element is positioned closest to the image plane, the focal length of the first lens element is f1, the focal length of the third lens element is f3, and they satisfy the relations: $1.0 < f/f1 < 1.7$, $0.6 < f/f3 < 1.8$.

When f/f1 satisfies the above relation, the displacement distance of the first lens element will not be too large, thus the total track length (TTL) of the imaging optical lens assembly will not become too long. This also ensures that the movement of the first lens element relative to the image plane has enough sensitivity required for focusing adjustment. By having the first lens element move along the optical axis to perform the focusing adjustment (the so-called internal focusing method), the total track length of the imaging optical lens assembly can be shortened effectively. TTL is defined as the on-axis spacing between the object-side surface of the first lens element and the image plane when the first lens element is positioned closest to the imaged object.

The relation $0.6 < f/f3 < 1.8$ enables the third lens element to effectively distribute the refractive power of the optical system, reducing the sensitivity of the optical system.

In the aforementioned imaging optical lens assembly, the on-axis spacing between the image-side surface of the first lens element and the image plane is D1 when the first lens element is positioned closest to the imaged object, the on-axis spacing between the image-side surface of the first lens element and the image plane is D2 when the first lens element is positioned closest to the image plane, the focal length of the imaging optical lens assembly is f when the first lens element is positioned closest to the image plane, and they satisfy the relation: $1.0 < (D1-D2)*100/f < 3.0$.

When the above relation is satisfied, the movement of the first lens element relative to the image plane has enough sensitivity required for focusing adjustment. The above relation also prevents the displacement distance of the first lens element from becoming too large.

In the aforementioned imaging optical lens assembly, the on-axis spacing between the third lens element and the fourth lens element is T34, the on-axis spacing between the second lens element and the third lens element is T23, and they satisfy the relation: $0.2 < T34/T23 < 1.6$.

When the above relation is satisfied, the off-axis aberration of the imaging optical lens assembly can be effectively corrected. The above relation also prevents the back focal length from becoming too short and thus causing the rear end of the lens assembly to have insufficient space to accommodate mechanical components.

In the aforementioned imaging optical lens assembly, the maximum focal length of the imaging optical lens assembly is $f_{max}$, the minimum focal length of the imaging optical lens assembly is $f_{min}$, and they satisfy the relation: $1 \leq f_{max}/f_{min} \leq 1.05$.

The above relation prevents the displacement distance of the first lens element from becoming too large and keeps the magnifying power of the optical system within a proper range.

In the aforementioned imaging optical lens assembly, the back focal length of the imaging optical lens assembly is BFL1 when the first lens element is positioned closest to the imaged object, the back focal length of the imaging optical lens assembly is BFL2 when the first lens element is positioned closest to the image plane, and they satisfy the relation: $|BFL1-BFL2| < 0.1$ mm.

Preferably, BFL1 and BFL2 satisfy the relation: $|BFL1-BFL2|=0$.

When the above relation is satisfied, the image plane can be fixed and the number of moving elements can be reduced, thereby reducing the cost and the variability in the manufacturing of the lens assembly.

In the aforementioned imaging optical lens assembly, it is preferable that the first lens element has a convex object-side surface so that the refractive power thereof can be enhanced to shorten the total track length of the imaging optical lens assembly.

In the aforementioned imaging optical lens assembly, it is preferable that the fourth lens element has a concave image-side surface.

In the aforementioned imaging optical lens assembly, it is preferable that the second lens element has a concave image-side surface and the third lens element has a concave object-side surface and a convex image-side surface, so that accumulation of aberrations can be avoided.

In the present imaging optical lens assembly, the first lens element provides a positive refractive power, and the aperture stop is located near the object side of the imaging optical lens assembly, thereby the exit pupil of the imaging optical lens assembly can be positioned far away from the image plane. Therefore, the light will be projected onto the electronic sensor at a nearly perpendicular angle, and this is the telecentric feature of the image side. The telecentric feature is very important to the photosensitive power of the current solid-state electronic sensor as it can improve the photosensitivity of the electronic sensor to reduce the probability of the occurrence of shading.

In addition, in optical systems with a wide field of view, the correction of distortion and chromatic aberration of magnification is especially necessary, and the correction can be made by placing the aperture stop in a location where the refractive power of the optical system is balanced. In the present imaging optical lens assembly, if the aperture stop is disposed between the first lens element and the imaged object, the telecentric feature will be enhanced to reduce the total track length of the optical system; if the aperture stop is disposed between the first lens element and the second lens element, the wide field of view is emphasized. Such an arrangement of the aperture stop also effectively reduces the sensitivity of the optical system.

In the present imaging optical lens assembly, the lens elements can be made of glass or plastic material. If the lens elements are made of glass, there is more flexibility in distributing the refractive power of the optical system. If plastic material is adopted to produce lens elements, the production cost will be reduced effectively. Additionally, the surfaces of the lens elements can be formed to be aspheric and made to be non-spherical easily, allowing more design parameter freedom which can be used to reduce aberrations and the number of the lens elements, so that the total track length of the imaging optical lens assembly can be shortened effectively.

In the aforementioned imaging optical lens assembly, it is preferable that the third lens element has a positive refractive power so that the refractive power of the optical system can be distributed effectively.

In the aforementioned imaging optical lens assembly, it is preferable that the Abbe number of the second lens element is V2, and it satisfies the relation: $V2 < 29$.

The above relation facilitates the correction of the chromatic aberration of the optical system.

And it will be more preferable that V2 satisfies the relation: V2<25.

In the aforementioned imaging optical lens assembly, it is preferable that the Abbe number of the first lens element is V1, and it satisfies the relation: 50<V1<62.

The above relation facilitates the correction of the astigmatism of the optical system.

In the aforementioned imaging optical lens assembly, it is preferable that the second lens element has a concave object-side surface.

According to another aspect of the present invention, the aforementioned imaging optical lens assembly further comprises an electronic sensor on which an object is imaged. When the first lens element is positioned closest to the imaged object, the total track length of the imaging optical lens assembly is TTL, which is defined as the on-axis spacing between the object-side surface of the first lens element and the image plane when the first lens element is positioned closest to the imaged object, and the maximum image height of the imaging optical lens assembly is ImgH, which is defined as half of the diagonal length of the effective pixel area of the electronic sensor, and they satisfy the relation: TTL/ImgH<1.95.

The above relation enables the imaging optical lens assembly to maintain a compact form.

Preferred embodiments of the present invention along with the appended drawings will be described in the following paragraphs.

Figure 2A:
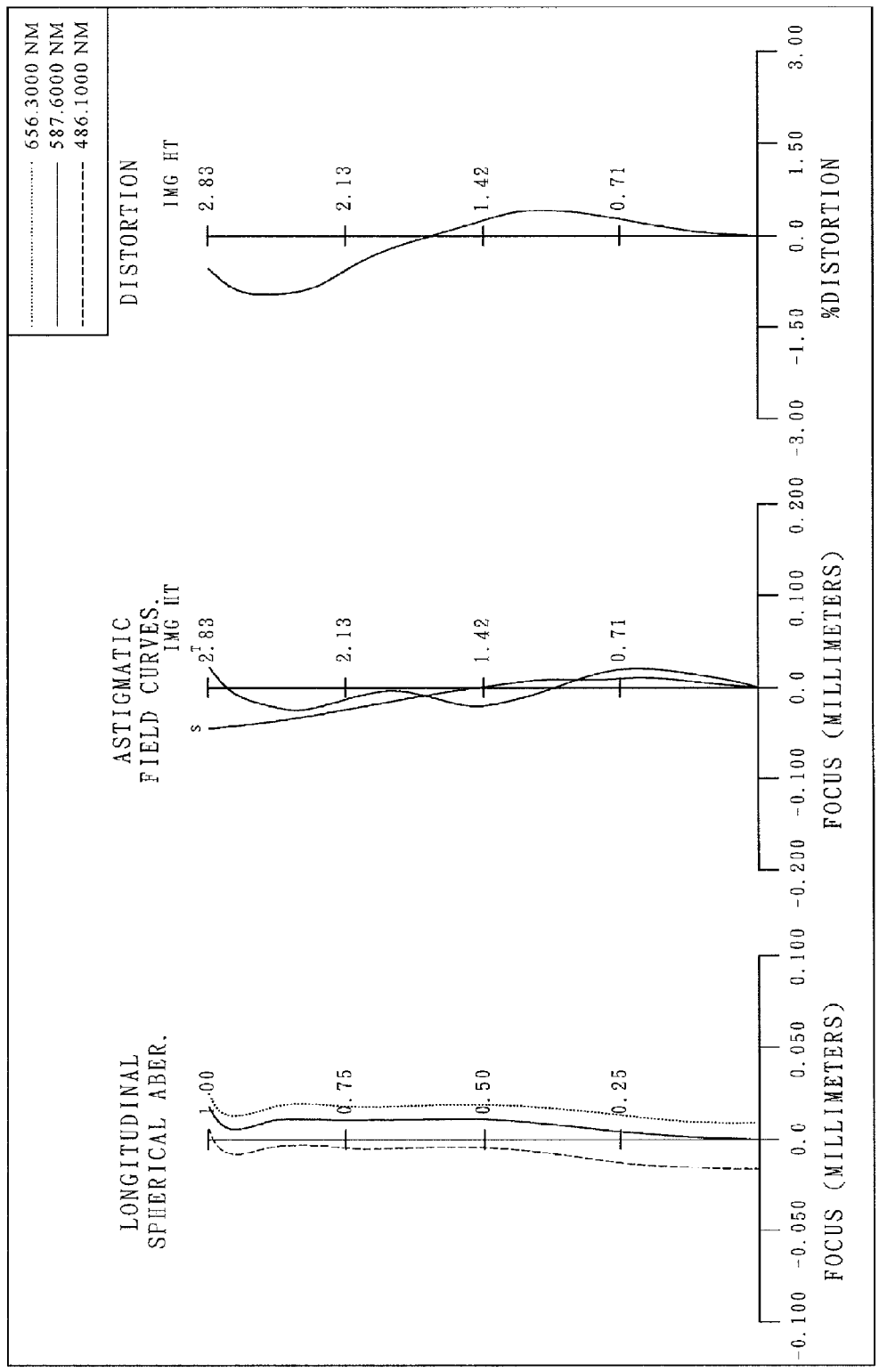
FIG. 2 shows the aberration curves of the first embodiment of the present invention.
Figure 2B:
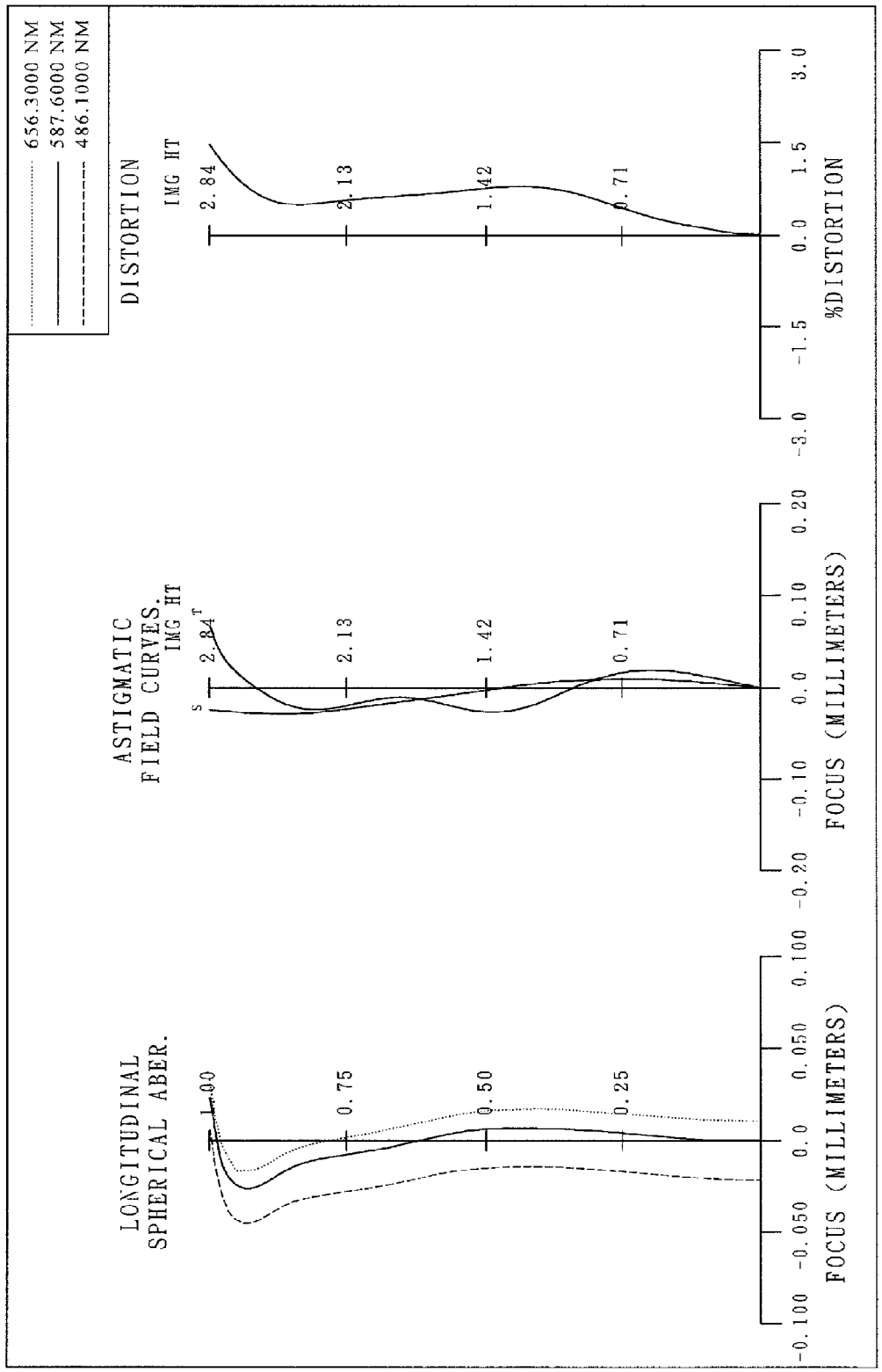

FIG. 1 shows an imaging optical lens assembly in accordance with a first embodiment of the present invention, and FIG. 2 shows the aberration curves of the first embodiment of the present invention. The imaging optical lens assembly of the first embodiment of the present invention, which mainly comprises two lens groups, includes, in order from the object side to the image side:

a first lens group comprising a plastic first lens element 100 with positive refractive power having a convex object-side surface 101 and a convex image-side surface 102, the object-side and image-side surfaces 101 and 102 of the first lens element 100 being aspheric, no lens element with refractive power being disposed between the first lens element 100 and an imaged object, the first lens element being the only lens element with refractive power in the first lens group a second lens group comprising, in order from the object side to the image side:

a plastic second lens element 110 with negative refractive power having a convex object-side surface 111 and a concave image-side surface 112, the object-side and image-side surfaces 111 and 112 of the second lens element 110 being aspheric;

a plastic third lens element 120 having a concave object-side surface 121 and a convex image-side surface 122, the object-side and image-side surfaces 121 and 122 of the third lens element 120 being aspheric; and a plastic fourth lens element 130 having a convex object-side surface 131 and a concave image-side surface 132, the object-side and image-side surfaces 131 and 132 of the fourth lens element 130 being aspheric;

an aperture stop 140 disposed between the first lens element 100 and the imaged object;

an IR filter 150 disposed between the image-side surface 132 of the fourth lens element 130 and the image plane 170, the IR filter 150 having no influence on the focal length of the imaging optical lens assembly;

a sensor cover glass 160 disposed between the IR filter 150 and the image plane 170, the sensor cover glass 160 having no influence on the focal length of the imaging optical lens assembly; and an image plane 170 disposed behind the sensor cover glass 160.

Focusing is performed by moving the first lens element along the optical axis, such that as a distance between the imaged object and the imaging optical lens assembly changes from far to near, a distance between the first lens element and the imaging surface changes from near to far, and during focusing the other lens elements in the imaging optical lens assembly do not move relative to the imaging plane.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present imaging optical lens assembly, the maximum focal length of the imaging optical lens assembly is $f_{max}$, the minimum focal length of the imaging optical lens assembly is $f_{min}$, and they satisfy the relation: $f_{max}/f_{min}=1.02$.

In the first embodiment of the present imaging optical lens assembly, the back focal length of the imaging optical lens assembly is BFL1 when the first lens element 100 is positioned closest to the imaged object, the back focal length of the imaging optical lens assembly is BFL2 when the first lens element 100 is positioned closest to the image plane 170, and they satisfy the relation: |BFL1−BFL2|=0.0.

In the first embodiment of the present imaging optical lens assembly, the on-axis spacing between the image-side surface 102 of the first lens element 100 and the image plane 170 is D1 when the first lens element 100 is positioned closest to the imaged object, the on-axis spacing between the image-side surface 102 of the first lens element 100 and the image plane 170 is D2 when the first lens element 100 is positioned closest to the image plane 170, the focal length of the imaging optical lens assembly is f when the first lens element 100 is positioned closest to the image plane 170, and they satisfy the relation: (D1−D2)*100/f=2.02.

In the first embodiment of the present imaging optical lens assembly, the Abbe number of the first lens element 100 is V1, and it satisfies the relation: V1=55.9.

In the first embodiment of the present imaging optical lens assembly, the Abbe number of the second lens element 110 is V2, and it satisfies the relation: V2=23.4.

In the first embodiment of the present imaging optical lens assembly, the on-axis spacing between the third lens element 120 and the fourth lens element 130 is T34, the on-axis spacing between the second lens element 110 and the third lens element 120 is T23, and they satisfy the relation: T34/T23=0.11.

In the first embodiment of the present imaging optical lens assembly, the focal length of the imaging optical lens assembly is f when the first lens element 100 is positioned closest to the image plane 170, the focal length of the first lens element 100 is f1, the focal length of the third lens element 120 is f3, and they satisfy the relations: f/f1=1.43, f/f3=1.42.

In the first embodiment of the present imaging optical lens assembly, the image plane 170 is provided with an electronic sensor on which an object is imaged. When the first lens element 100 is positioned closest to the imaged object, the total track length of the imaging optical lens assembly is TTL and the maximum image height of the imaging optical lens assembly is ImgH, and they satisfy the relation: TTL/ImgH=1.84.

The detailed optical data of the first embodiment is shown in FIG. 7 (TABLE 1), and the aspheric surface data is shown in FIG. 8 (TABLE 2), wherein the units of the radius of curvature, the thickness and the focal length are expressed in mm, and HFOV is half of the maximal field of view.

Figure 3:
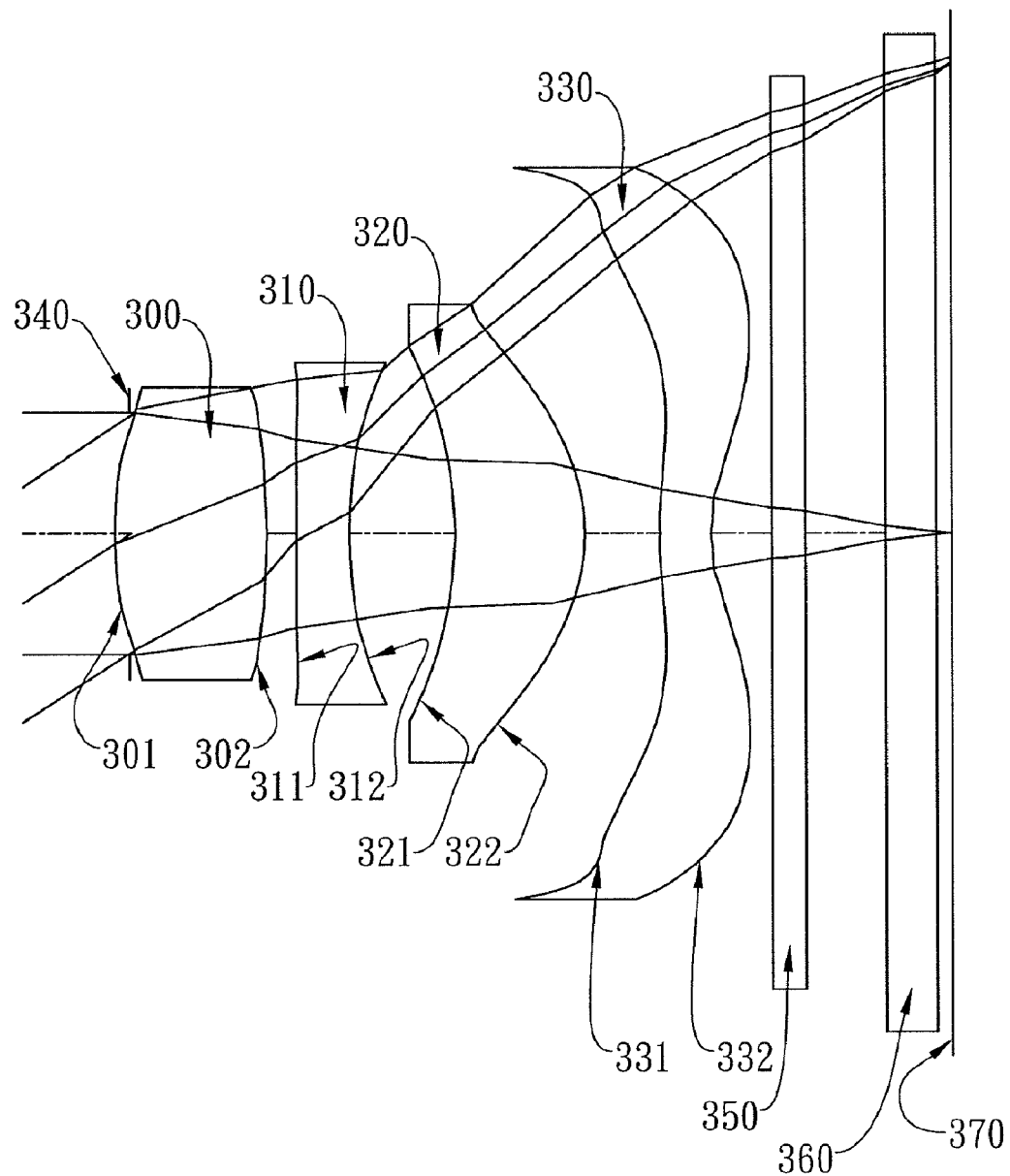
FIG. 3 shows an imaging optical lens assembly in accordance with a second embodiment of the present invention.
Figure 4A:
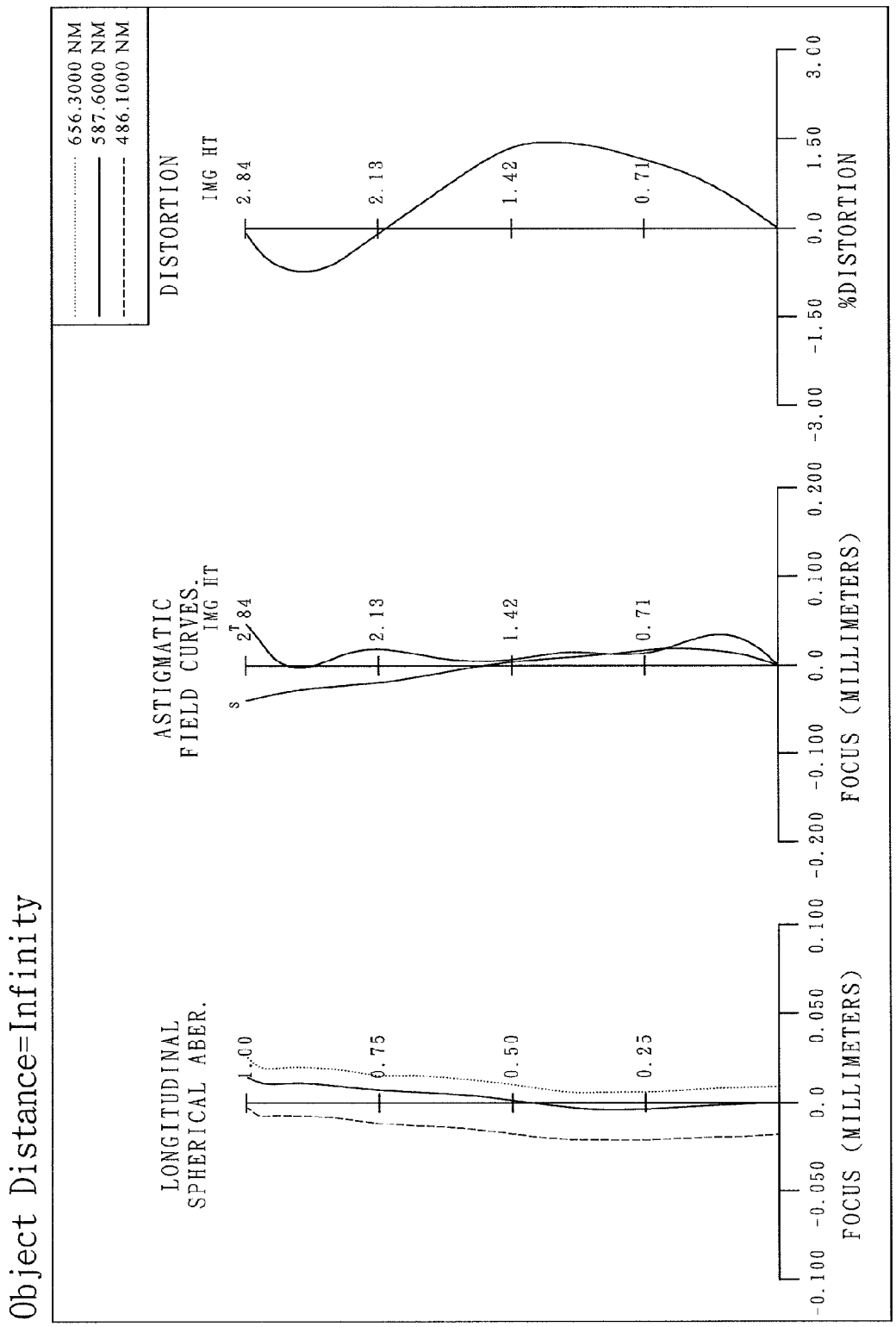
FIG. 4 shows the aberration curves of the second embodiment of the present invention.
Figure 4B:
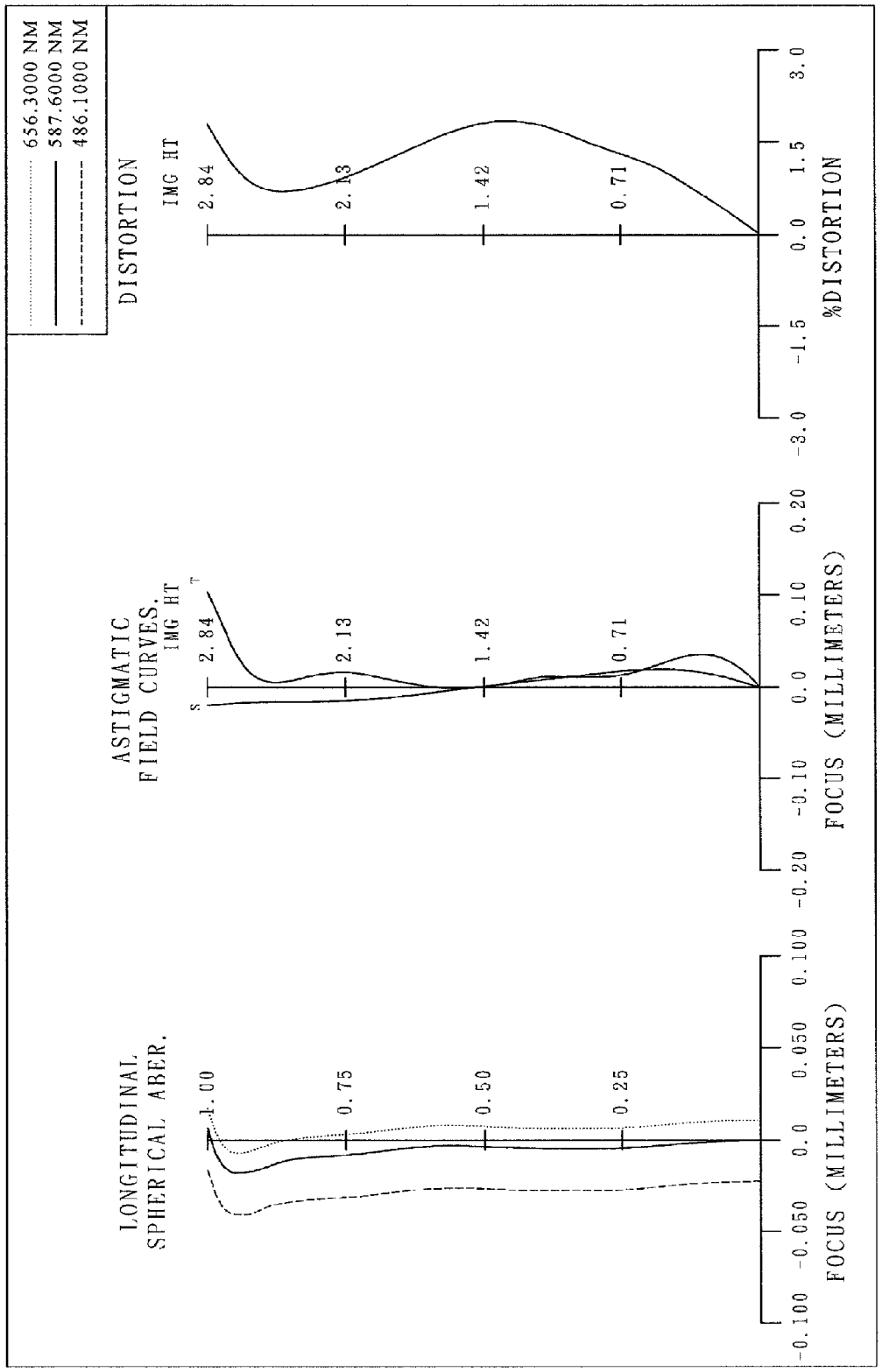

FIG. 3 shows an imaging optical lens assembly in accordance with a second embodiment of the present invention, and FIG. 4 shows the aberration curves of the second embodiment of the present invention. The imaging optical lens assembly of the second embodiment of the present invention, which mainly comprises two lens groups, includes, in order from the object side to the image side:

a first lens group comprising a plastic first lens element 300 with positive refractive power having a convex object-side surface 301 and a convex image-side surface 302, the object-side and image-side surfaces 301 and 302 of the first lens element 300 being aspheric, no lens element with refractive power being disposed between the first lens element 300 and an imaged object, the first lens element being the only lens element with refractive power in the first lens group;

a second lens group comprising, in order from the object side to the image side:

a plastic second lens element 310 with negative refractive power having a concave object-side surface 311 and a concave image-side surface 312, the object-side and image-side surfaces 311 and 312 of the second lens element 310 being aspheric;

a plastic third lens element 320 having a concave object-side surface 321 and a convex image-side surface 322, the object-side and image-side surfaces 321 and 322 of the third lens element 320 being aspheric; and a plastic fourth lens element 330 having a convex object-side surface 331 and a concave image-side surface 332, the object-side and image-side surfaces 331 and 332 of the fourth lens element 330 being aspheric;

an aperture stop 340 disposed between the first lens element 300 and the imaged object;

an IR filter 350 disposed between the image-side surface 332 of the fourth lens element 330 and the image plane 370, the IR filter 350 having no influence on the focal length of the imaging optical lens assembly;

a sensor cover glass 360 disposed between the IR filter 350 and the image plane 370, the sensor cover glass 360 having no influence on the focal length of the imaging optical lens assembly; and an image plane 370 disposed behind the sensor cover glass 360.

Focusing is performed by moving the first lens element along the optical axis, such that as a distance between the imaged object and the imaging optical lens assembly changes from far to near, a distance between the first lens element and the imaging surface changes from near to far, and during focusing the other lens elements in the imaging optical lens assembly do not move relative to the imaging plane.

The equation of the aspheric surface profiles of the second embodiment has the same form as that of the first embodiment.

In the second embodiment of the present imaging optical lens assembly, the maximum focal length of the imaging optical lens assembly is $f_{max}$, the minimum focal length of the imaging optical lens assembly is $f_{min}$, and they satisfy the relation: $f_{max}/f_{min}=1.03$.

In the second embodiment of the present imaging optical lens assembly, the back focal length of the imaging optical lens assembly is BFL1 when the first lens element 300 is positioned closest to the imaged object, the back focal length of the imaging optical lens assembly is BFL2 when the first lens element 300 is positioned closest to the image plane 370, and they satisfy the relation: |BFL1−BFL2|=0.0.

In the second embodiment of the present imaging optical lens assembly, the on-axis spacing between the image-side surface 302 of the first lens element 300 and the image plane 370 is D1 when the first lens element 300 is positioned closest to the imaged object, the on-axis spacing between the image-side surface 302 of the first lens element 300 and the image plane 370 is D2 when the first lens element 300 is positioned closest to the image plane 370, the focal length of the imaging optical lens assembly is f when the first lens element 300 is positioned closest to the image plane 370, and they satisfy the relation: (D1−D2)*100/f=1.98.

In the second embodiment of the present imaging optical lens assembly, the Abbe number of the first lens element 300 is V1, and it satisfies the relation: V1=55.9.

In the second embodiment of the present imaging optical lens assembly, the Abbe number of the second lens element 310 is V2, and it satisfies the relation: V2=23.4.

In the second embodiment of the present imaging optical lens assembly, the on-axis spacing between the third lens element 320 and the fourth lens element 330 is T34, the on-axis spacing between the second lens element 310 and the third lens element 320 is T23, and they satisfy the relation: T34/T23=1.19.

In the second embodiment of the present imaging optical lens assembly, the focal length of the imaging optical lens assembly is f when the first lens element 300 is positioned closest to the image plane 370, the focal length of the first lens element 300 is f1, the focal length of the third lens element 320 is f3, and they satisfy the relations: f/f1=1.42, f/f3=0.90.

In the second embodiment of the present imaging optical lens assembly, the image plane 370 is provided with an electronic sensor on which an object is imaged. When the first lens element 300 is positioned closest to the imaged object, the total track length of the imaging optical lens assembly is TTL and the maximum image height of the imaging optical lens assembly is ImgH, and they satisfy the relation: TTL/ImgH=1.75.

The detailed optical data of the second embodiment is shown in FIG. 9 (TABLE 3), and the aspheric surface data is shown in FIG. 10 (TABLE 4), wherein the units of the radius of curvature, the thickness and the focal length are expressed in mm, and HFOV is half of the maximal field of view.

Figure 5:
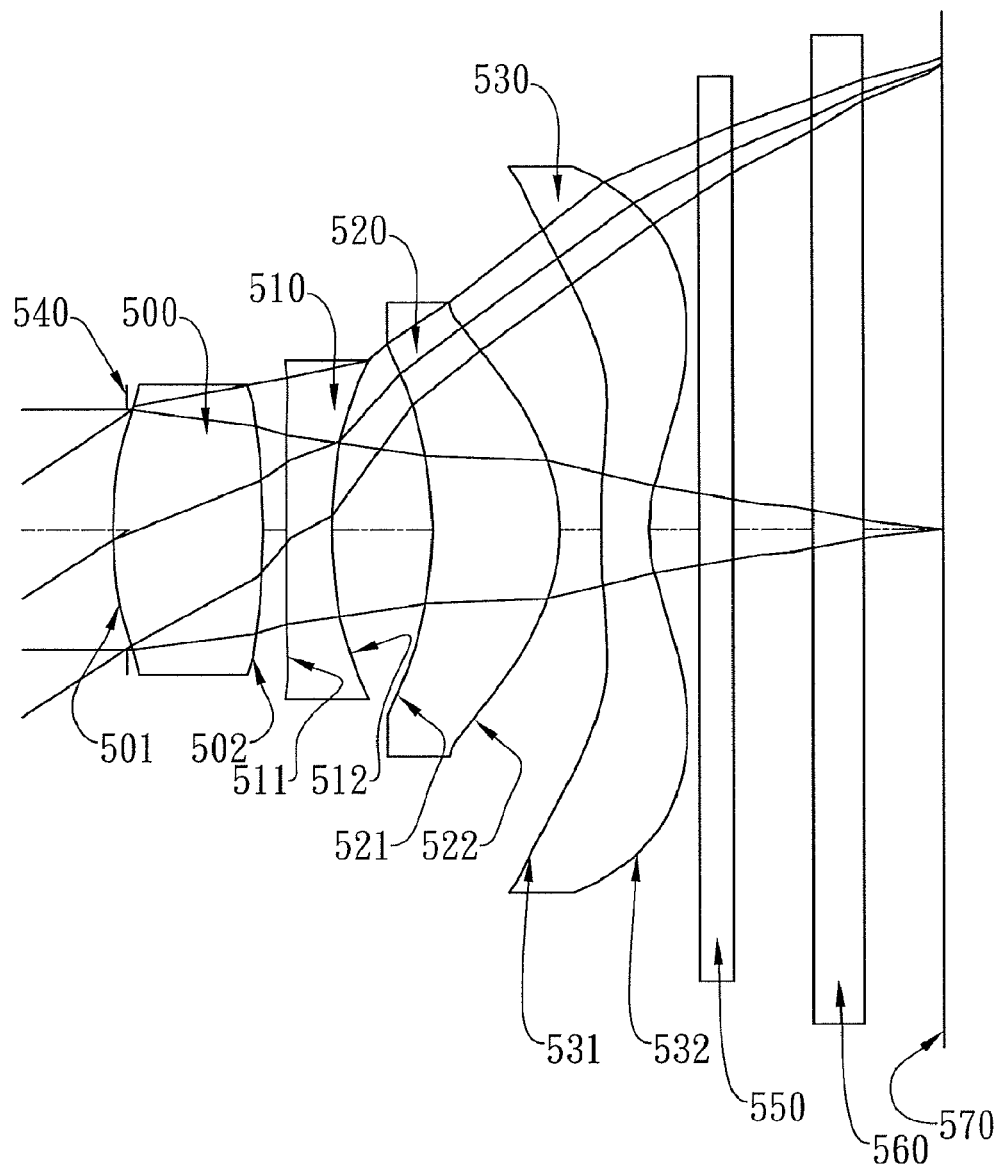
FIG. 5 shows an imaging optical lens assembly in accordance with a third embodiment of the present invention.
Figure 6A:
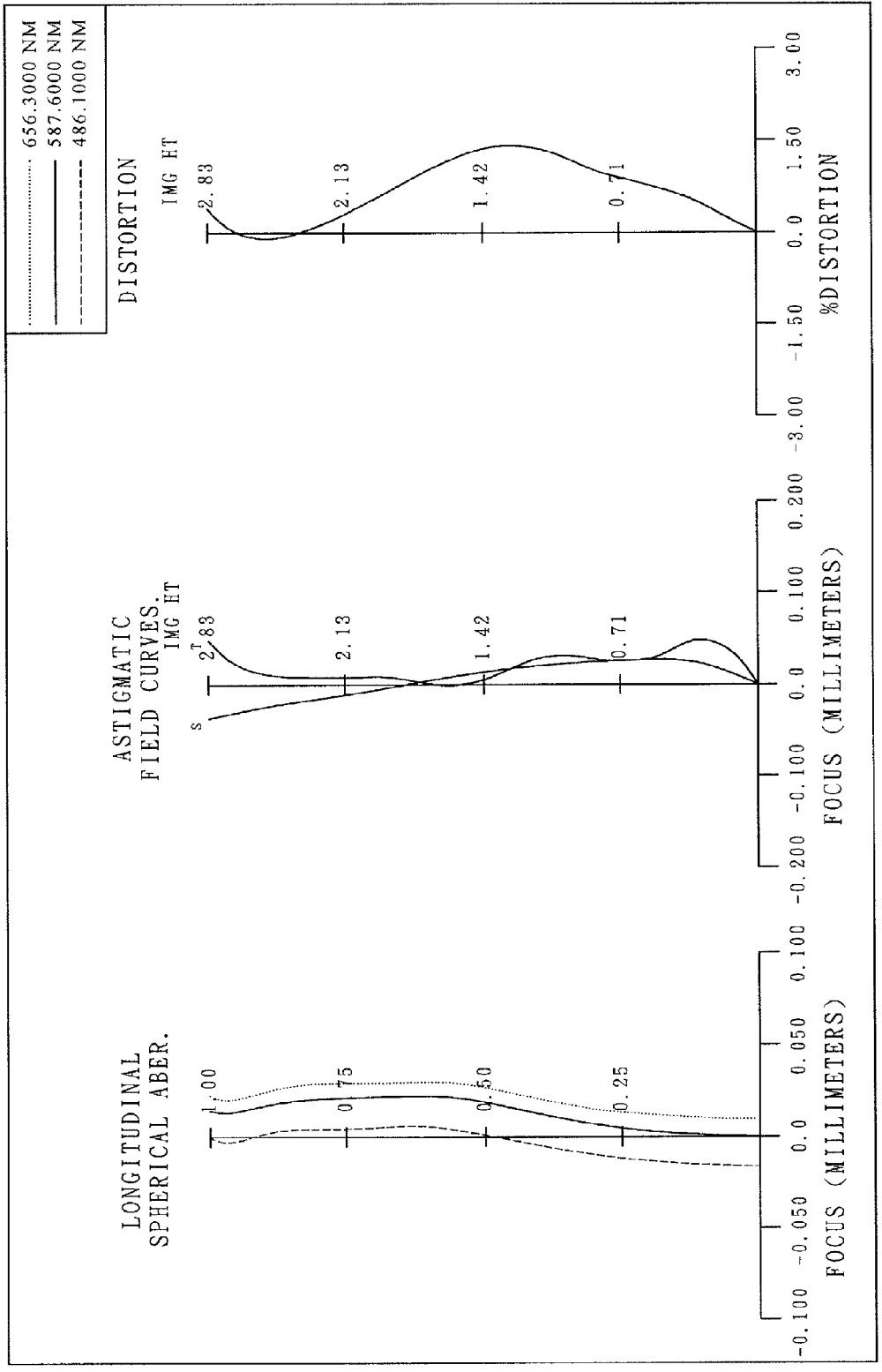
FIG. 6 shows the aberration curves of the third embodiment of the present invention.
Figure 6B:
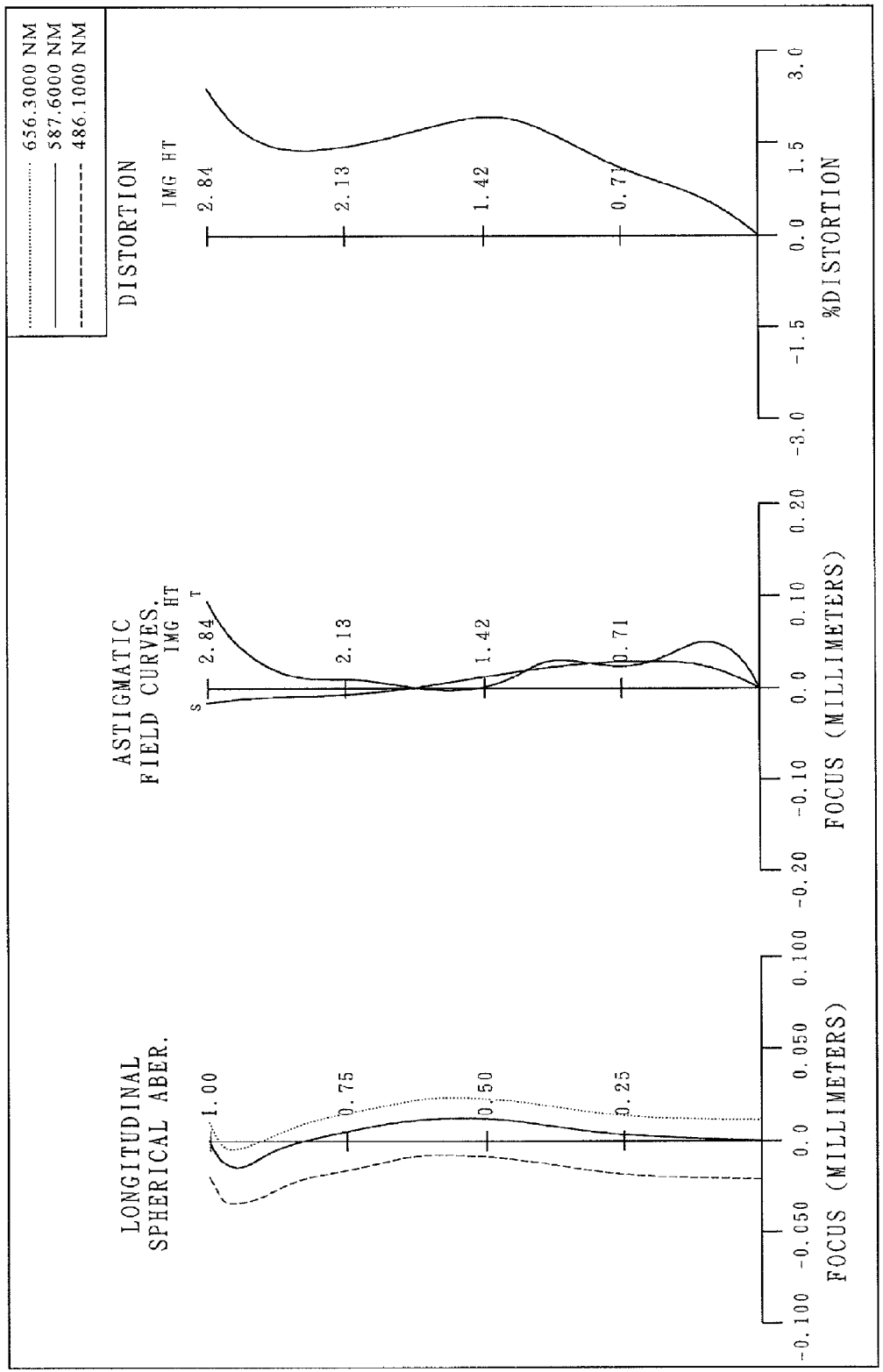

FIG. 5 shows an imaging optical lens assembly in accordance with a third embodiment of the present invention, and FIG. 6 shows the aberration curves of the third embodiment of the present invention. The imaging optical lens assembly of the third embodiment of the present invention, which mainly comprises two lens groups, includes, in order from the object side to the image side:

a first lens group comprising a plastic first lens element 500 with positive refractive power having a convex object-side surface 501 and a convex image-side surface 502, the object-side and image-side surfaces 501 and 502 of the first lens element 500 being aspheric, no lens element with refractive power being disposed between the first lens element 500 and an imaged object, the first lens element being the only lens element with refractive power in the first lens group;

a second lens group comprising, in order from the object side to the image side:
  a plastic second lens element 510 with negative refractive power having a concave object-side surface 511 and a concave image-side surface 512, the object-side and image-side surfaces 511 and 512 of the second lens element 510 being aspheric;
  a plastic third lens element 520 having a concave object-side surface 521 and a convex image-side surface 522, the object-side and image-side surfaces 521 and 522 of the third lens element 520 being aspheric; and
  a plastic fourth lens element 530 having a convex object-side surface 531 and a concave image-side surface 532, the object-side and image-side surfaces 531 and 532 of the fourth lens element 530 being aspheric;

an aperture stop 540 disposed between the first lens element 500 and the imaged object;

an IR filter 550 disposed between the image-side surface 532 of the fourth lens element 530 and the image plane 570, the IR filter 550 having no influence on the focal length of the imaging optical lens assembly;

a sensor cover glass 560 disposed between the IR filter 550 and the image plane 570, the sensor cover glass 560 having no influence on the focal length of the imaging optical lens assembly; and an image plane 570 disposed behind the sensor cover glass 560.

Focusing is performed by moving the first lens element along the optical axis, such that as a distance between the imaged object and the imaging optical lens assembly changes from far to near, a distance between the first lens element and the imaging surface changes from near to far, and during focusing the other lens elements in the imaging optical lens assembly do not move relative to the imaging plane.

The equation of the aspheric surface profiles of the third embodiment has the same form as that of the first embodiment.

In the third embodiment of the present imaging optical lens assembly, the maximum focal length of the imaging optical lens assembly is $f_{max}$, the minimum focal length of the imaging optical lens assembly is $f_{min}$ and they satisfy the relation: $f_{max}/f_{min}=1.03$.

In the third embodiment of the present imaging optical lens assembly, the back focal length of the imaging optical lens assembly is BFL1 when the first lens element 500 is positioned closest to the imaged object, the back focal length of the imaging optical lens assembly is BFL2 when the first lens element 500 is positioned closest to the image plane 570, and they satisfy the relation: |BFL1−BFL2|=0.0.

In the third embodiment of the present imaging optical lens assembly, the on-axis spacing between the image-side surface 502 of the first lens element 500 and the image plane 570 is D1 when the first lens element 500 is positioned closest to the imaged object, the on-axis spacing between the image-side surface 502 of the first lens element 500 and the image plane 570 is D2 when the first lens element 500 is positioned closest to the image plane 570, the focal length of the imaging optical lens assembly is f when the first lens element 500 is positioned closest to the image plane 570, and they satisfy the relation: (D1−D2)*100/f=1.87.

In the third embodiment of the present imaging optical lens assembly, the Abbe number of the first lens element 500 is V1, and it satisfies the relation: V1=55.9.

In the third embodiment of the present imaging optical lens assembly, the Abbe number of the second lens element 510 is V2, and it satisfies the relation: V2=23.4.

In the third embodiment of the present imaging optical lens assembly, the on-axis spacing between the third lens element 520 and the fourth lens element 530 is T34, the on-axis spacing between the second lens element 510 and the third lens element 520 is T23, and they satisfy the relation: T34/T23=0.47.

In the third embodiment of the present imaging optical lens assembly, the focal length of the imaging optical lens assembly is f when the first lens element 500 is positioned closest to the image plane 570, the focal length of the first lens element 500 is f1, the focal length of the third lens element 520 is f3, and they satisfy the relations: f/f1=1.46, f/f3=1.31.

In the third embodiment of the present imaging optical lens assembly, the image plane 570 is provided with an electronic sensor on which an object is imaged. When the first lens element 500 is positioned closest to the imaged object, the total track length of the imaging optical lens assembly is TTL and the maximum image height of the imaging optical lens assembly is ImgH, and they satisfy the relation: TTL/ImgH=1.75.

The detailed optical data of the third embodiment is shown in FIG. 11 (TABLE 5), and the aspheric surface data is shown in FIG. 12 (TABLE 6), wherein the units of the radius of curvature, the thickness and the focal length are expressed in mm, and HFOV is half of the maximal field of view.

It is to be noted that TABLES 1-6 (illustrated in FIGS. 7-12 respectively) show different data of the different embodiments, however, the data of the different embodiments are obtained from experiments. Therefore, any imaging optical lens assembly of the same structure is considered to be within the scope of the present invention even if it uses different data. TABLE 7 (illustrated in FIG. 13) shows the data of the respective embodiments resulted from the equations.

The aforementioned arrangement of optical elements and focusing adjustment method enable the imaging optical lens assembly to obtain good image quality. In addition, the focusing adjustment method introduced in the present invention requires less power consumption and facilitates a significant reduction in the total track length as compared to a conventional photographing lens with focusing adjustment function.

What is claimed is:

1. An imaging optical lens assembly including, in order from an object side to an image side:
  a first lens group comprising a first lens element with positive refractive power, no lens element with refractive power being disposed between the first lens element and an imaged object, the first lens element being the only lens element with refractive power in the first lens group; and
  a second lens group comprising, in order from the object side to the image side:
    a second lens element with negative refractive power;
    a third lens element; and
    a fourth lens element;
  wherein focusing adjustment is performed by moving the first lens element along an optical axis, such that as a distance between the object and the imaging optical lens assembly changes from far to near, a distance between the first lens element and an image plane changes from near to far, and during focusing the other lens elements in the imaging optical lens assembly do not move relative to the imaging plane; and wherein the number of the lens elements with refractive power in the imaging optical lens assembly is N, and it satisfies the relation: $4 \leq N \leq 5$.

2. The imaging optical lens assembly according to claim 1, wherein a maximum focal length of the imaging optical lens assembly is $f_{max}$, a minimum focal length of the imaging optical lens assembly is $f_{min}$, and they satisfy the relation: $1 \leq f_{max}/f_{min} \leq 1.05$.

3. The imaging optical lens assembly according to claim 2, wherein a back focal length of the imaging optical lens assembly is BFL1 when the first lens element is positioned closest to the imaged object, a back focal length of the imaging optical lens assembly is BFL2 when the first lens element is positioned closest to the image plane, and they satisfy the relation: |BFL1−BFL2|<0.1 mm.

4. The imaging optical lens assembly according to claim 3, wherein an on-axis spacing between the image-side surface of the first lens element and the image plane is D1 when the first lens element is positioned closest to the imaged object, an on-axis spacing between the image-side surface of the first lens element and the image plane is D2 when the first lens element is positioned closest to the image plane, a focal length of the imaging optical lens element is f when the first lens element is positioned closest to the image plane, and they satisfy the relation: 1.0<(D1−D2)*100/f<3.0.

5. The imaging optical lens assembly according to claim 3, wherein the first lens element has a convex object-side surface.

6. The imaging optical lens assembly according to claim 5, wherein the fourth lens element has a concave image-side surface.

7. The imaging optical lens assembly according to claim 6, wherein the second lens element has a concave image-side surface and the third lens element has a concave object-side surface and a convex image-side surface.

8. The imaging optical lens assembly according to claim 7, wherein the object-side and image-side surfaces of at least three of said lens elements are aspheric, and an aperture stop is disposed between the first lens element and the imaged object.

9. The imaging optical lens assembly according to claim 8, wherein the third lens element has a positive refractive power.

10. The imaging optical lens assembly according to claim 9, wherein the second, third and fourth lens elements are made of plastic material; and wherein an Abbe number of the second lens element is V2, and it satisfies the relation: V2<29.

11. The imaging optical lens assembly according to claim 10, wherein the first lens element is made of plastic material; and wherein an Abbe number of the first lens element is V1, and it satisfies the relation: 50<V1<62.

12. The imaging optical lens assembly according to claim 9, wherein the second lens element has a concave object-side surface.

13. The imaging optical lens assembly according to claim 12, wherein an on-axis spacing between the third lens element and the fourth lens element is T34, an on-axis spacing between the second lens element and the third lens element is T23, and they satisfy the relation: 0.2<T34/T23<1.6.

14. The imaging optical lens assembly according to claim 4, wherein a focal length of the first lens element is f1, a focal length of the third lens element is f3, and they satisfy the relations: 1.0<f/f1<1.7, 0.6<f/f3<1.8.

15. The imaging optical lens assembly according to claim 14 further comprising an electronic sensor on which an object is imaged; wherein when the first lens element is positioned closest to the imaged object, a total track length of the imaging optical lens assembly is TTL and a maximum image height of the imaging optical lens assembly is ImgH, and they satisfy the relation: TTL/ImgH<1.95.

16. The imaging optical lens assembly according to claim 1 further comprising an electronic sensor on which an object is imaged; wherein when the first lens element is positioned closest to the imaged object, the total track length of the imaging optical lens assembly is TTL and the maximum image height of the imaging optical lens assembly is ImgH, and they satisfy the relation: TTL/ImgH<1.95.

17. The imaging optical lens assembly according to claim 11, wherein the Abbe number of the second lens element is V2, and it satisfies the relation: V2<25.

18. A method for performing focusing for an imaging optical lens assembly, wherein the imaging optical lens assembly includes, in order from an object side to an image side: a first lens group comprising a first lens element with positive refractive power, no lens element with refractive power being disposed between the first lens element and an imaged object, the first lens element being the only lens element with refractive power in the first lens group; and a second lens group comprising, in order from the object side to the image side: a second lens element with negative refractive power; a third lens element and a fourth lens element; and wherein the method for performing focusing includes moving the first lens element along an optical axis, such that as a distance between the imaged object and the imaging optical lens assembly changes from far to near, a distance between the first lens element and an image plane changes from near to far.

19. The method for performing focusing for an imaging optical lens assembly according to claim 18, wherein the object is imaged on an electronic sensor.

* * * * *